United States Patent
Hashimoto

(10) Patent No.: US 11,264,175 B2
(45) Date of Patent: Mar. 1, 2022

(54) MULTILAYER CERAMIC CAPACITOR

(71) Applicant: Murata Manufacturing Co., Ltd., Nagaokakyo (JP)

(72) Inventor: Hideyuki Hashimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/824,735

(22) Filed: Mar. 20, 2020

(65) Prior Publication Data

US 2020/0312570 A1 Oct. 1, 2020

(30) Foreign Application Priority Data

Mar. 29, 2019 (JP) ............... JP2019-066709

(51) Int. Cl.
*H01G 4/30* (2006.01)
*H01G 4/012* (2006.01)
(Continued)

(52) U.S. Cl.
CPC ............ *H01G 4/30* (2013.01); *H01G 4/008* (2013.01); *H01G 4/012* (2013.01);
(Continued)

(58) Field of Classification Search
CPC ...... H01G 4/008; H01G 4/0085; H01G 4/012; H01G 4/1209; H01G 4/1227; H01G 4/1236; H01G 4/232; H01G 4/248; H01G 4/30

See application file for complete search history.

(56) References Cited

U.S. PATENT DOCUMENTS 6,906,906 B2 * 6/2005 Hattori ............... H01G 4/008
361/305
7,859,823 B2 * 12/2010 Suzuki ............... H01G 4/012
361/321.1
(Continued)

FOREIGN PATENT DOCUMENTS

JP 2007-335726 A 12/2007
JP 2012-227197 A 11/2012
(Continued)

OTHER PUBLICATIONS

Official Communication issued in corresponding Korean Patent Application No. 10-2020-0024954, dated May 27, 2021.

*Primary Examiner* — Nathan Milakovich
(74) *Attorney, Agent, or Firm* — Keating & Bennett, LLP

(57) ABSTRACT

A multilayer ceramic capacitor includes a ceramic main body including dielectric layers and internal electrodes, principal surfaces, side surfaces, and end surfaces, and an external electrode electrically connected to the internal electrode on both end surfaces. The dielectric layer includes at least one element of Si and Mg. In a section defined by the width and lamination directions at a position of a central portion in the length direction of the ceramic main body, an outside in the width direction is higher than a central portion in the width direction in an amount of at least one element existing in a rectangular region of about 10 μm×about 10 μm of the dielectric layer in planar view, and continuity of the internal electrodes within a range of about 10 μm from an end in the width direction of the internal electrodes is greater than or equal to about 95%.

12 Claims, 5 Drawing Sheets

(51) Int. Cl.
  *H01G 4/232* (2006.01)
  *H01G 4/008* (2006.01)
  *H01G 4/12* (2006.01)
  *H01G 4/248* (2006.01)

(52) U.S. Cl.
  CPC ......... *H01G 4/1227* (2013.01); *H01G 4/1236* (2013.01); *H01G 4/232* (2013.01); *H01G 4/248* (2013.01)

(56) References Cited

U.S. PATENT DOCUMENTS

| | | | | |
|---|---|---|---|---|
| 9,305,708 | B2* | 4/2016 | Kai | H01G 4/1236 |
| 9,530,566 | B2* | 12/2016 | Ishida | H01G 4/12 |
| 10,115,524 | B2* | 10/2018 | Sugita | H01G 4/1209 |
| 11,037,727 | B2* | 6/2021 | Cha | H01G 4/005 |
| 11,056,280 | B2* | 7/2021 | Ariizumi | C04B 35/4682 |
| 2011/0110014 | A1 | 5/2011 | Hirata et al. | |
| 2012/0250221 | A1* | 10/2012 | Yamashita | H01G 4/228 361/321.2 |
| 2015/0364259 | A1 | 12/2015 | Kanzaki et al. | |
| 2017/0330686 | A1 | 11/2017 | Sugita | |
| 2019/0362897 | A1* | 11/2019 | Kato | H01G 4/232 |
| 2020/0258689 | A1* | 8/2020 | Kato | H01G 4/012 |

FOREIGN PATENT DOCUMENTS

| | | | |
|---|---|---|---|
| JP | 2016-015465 A | 1/2016 |
| KR | 10-2011-0018936 A | 2/2011 |
| KR | 10-2014-0107692 A | 9/2014 |
| KR | 10-2017-0127373 A | 11/2017 |

\* cited by examiner

MULTILAYER CERAMIC CAPACITOR

CROSS REFERENCE TO RELATED APPLICATIONS

This application claims the benefit of priority to Japanese Patent Application No. 2019-066709 filed on Mar. 29, 2019. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, there is known a multilayer ceramic capacitor including a ceramic main body including a plurality of laminated dielectric layers and a plurality of internal electrodes; and an external electrode provided on both end surfaces of the ceramic main body.

Japanese Patent Laid-Open No. 2007-335726 discloses a multilayer ceramic capacitor having such a structure. In the multilayer ceramic capacitor, an internal electrode includes a void corresponding to a thickness of the internal electrode, and a porosity in a predetermined range of the internal electrode ranges from 5% to 15%. Japanese Patent Laying-Open No. 2007-335726 describes that the multilayer ceramic capacitor having the above configuration can prevent generation of a crack in the ceramic main body.

However, in the structure of the multilayer ceramic capacitor described in Japanese Patent Laying-Open No. 2007-335726, when a rapid thermal change is generated, there is a possibility of generating cracks in the ceramic main body due to cracks arising from the void.

SUMMARY OF THE INVENTION

Preferred embodiments of the present invention provide multilayer ceramic capacitors that are each capable of preventing the generation of cracks in a ceramic main body by decreasing the number of voids included in the internal electrode.

According to a preferred embodiment of the present invention, a multilayer ceramic capacitor includes a ceramic main body including a plurality of laminated dielectric layers and a plurality of internal electrodes, the ceramic main body including a first principal surface and a second principal surface opposed to each other in a lamination direction, a first side surface and a second side surface opposed to each other in a width direction orthogonal or substantially orthogonal to the lamination direction, and a first end surface and a second end surface opposed to each other in a length direction orthogonal or substantially orthogonal to the lamination direction and the width direction; and an external electrode electrically connected to the internal electrode and provided on each of the first end surface and the second end surface of the ceramic main body. The dielectric layer includes at least one element of Si and Mg, in a section defined by the width direction and the lamination direction and obtained by cutting the ceramic main body at a position of a central portion in the length direction, an outside in the width direction is higher than a central portion in the width direction in an amount of the at least one element existing in a rectangular or substantially rectangular region of about 10 μm×about 10 μm of the dielectric layer in planar view, and continuity of the internal electrodes within a range of about 10 μm from an end in the width direction of the internal electrodes is greater than or equal to about 95%.

In a multilayer ceramic capacitor according to a preferred embodiment of the present invention, preferably in the section defined by the width direction and the lamination direction of the ceramic main body, a segregation amount of the at least one element in the rectangular or substantially rectangular region of about 10 μm×about 10 μm located on an outside in the width direction of the dielectric layers is larger than a segregation amount of the at least one element in the rectangular or substantially rectangular region of about 10 μm×about 10 μm located on an outside in the lamination direction of the dielectric layers.

In a multilayer ceramic capacitor according to a preferred embodiment of the present invention, preferably the continuity of the internal electrode within the range of about 10 μm from the end in the width direction of the internal electrode is greater than or equal to about 98%.

In a multilayer ceramic capacitor according to a preferred embodiment of the present invention, preferably an average particle size of a dielectric particle at the end in the width direction of the dielectric layers located on the outside in the lamination direction is greater than or equal to about 50 nm and less than or equal to about 1000 nm, and an average particle size of the dielectric particle in the central portion in the width direction of the dielectric layers located in a central portion in the lamination direction is greater than or equal to about 50 nm and less than or equal to about 500 nm.

In a multilayer ceramic capacitor according to a preferred embodiment of the present invention, preferably the at least one element is segregated in at least some cavities of the internal electrode.

In multilayer ceramic capacitors according to preferred embodiments of the present invention, the at least one element of Si and Mg is included in the dielectric layer, and the outside in the width direction of the dielectric layer is higher than the central portion in the width direction of the dielectric layer in the amount of the at least one element included in the rectangular or substantially rectangular region of about 10 μm×about 10 μm of the dielectric layer in planar view. With this structure, the void is able to be decreased by densifying the dielectric layer, and the generation of cracks is able to be prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings.

Figure 1:
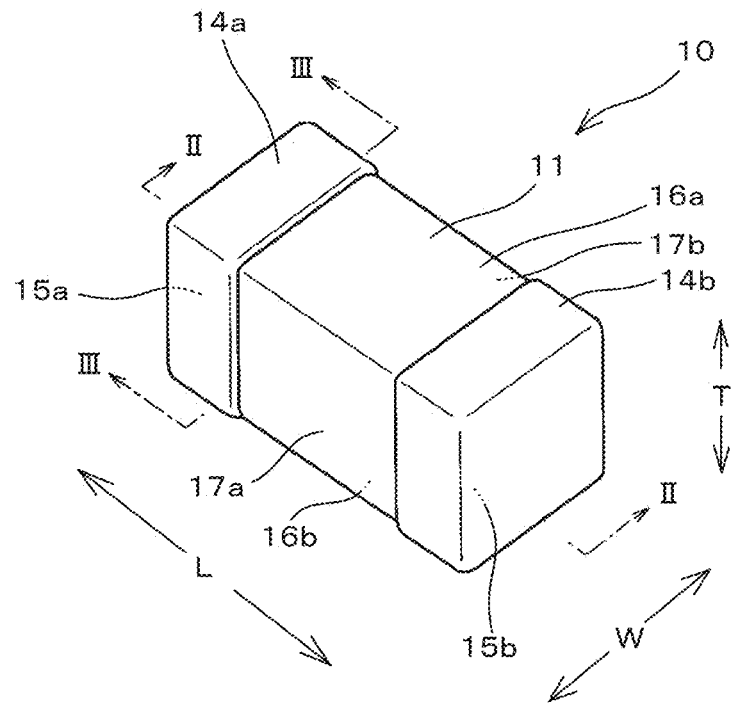
FIG. 1 is a perspective view illustrating a multilayer ceramic capacitor according to a preferred embodiment of the present invention.
Figure 2:
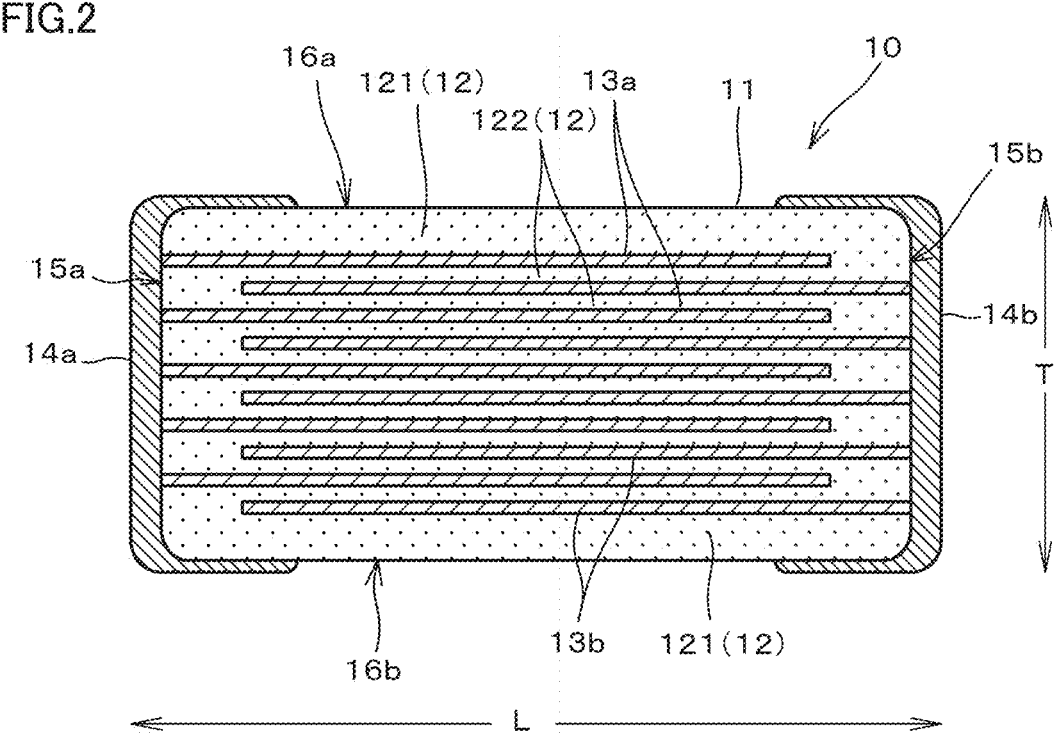
FIG. 2 is a sectional view taken along line II-II of the multilayer ceramic capacitor illustrated in FIG. 1.
Figure 3:
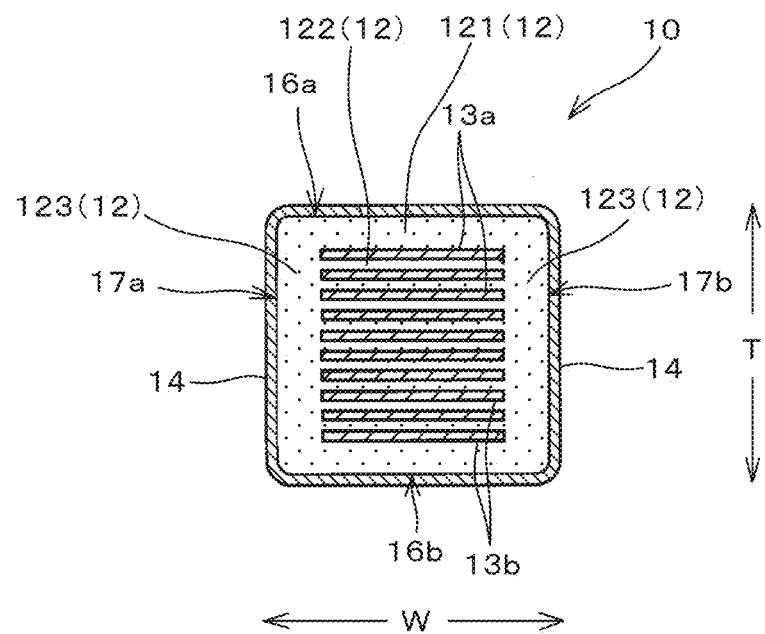
FIG. 3 is a sectional view taken along line of the multilayer ceramic capacitor illustrated in FIG. 1.

FIG. 1 is a perspective view illustrating a multilayer ceramic capacitor 10 according to a preferred embodiment of the present invention. FIG. 2 is a sectional view taken along line II-II of multilayer ceramic capacitor 10 in FIG. 1. FIG. 3 is a sectional view taken along line III-III of multilayer ceramic capacitor 10 in FIG. 1.

As illustrated in FIGS. 1 to 3, multilayer ceramic capacitor 10 is an electronic component having a rectangular or substantially rectangular parallelepiped shape, and includes a ceramic main body 11 and a pair of external electrodes 14a, 14b. As illustrated in FIG. 1, the pair of external electrodes 14a, 14b are opposed to each other.

A direction in which the pair of external electrodes 14a, 14b are opposed to each other is defined as a length direction L of multilayer ceramic capacitor 10, and a direction in which dielectric layer 12 and internal electrodes 13a, 13b (to be described below) are laminated is defined as a lamination direction T, and a direction orthogonal or substantially orthogonal to both length direction L and lamination direction T is defined as a width direction W.

For example, dimensions in length direction L, width direction W, and lamination direction T of multilayer ceramic capacitor 10 preferably range from about 0.2 mm to about 3.2 mm, from about 0.1 mm to about 2.5 mm, and from about 0.1 mm to about 2.5 mm, respectively. However, the dimensions of multilayer ceramic capacitor 10 are not limited to the above numerical values. The dimensions of multilayer ceramic capacitor 10 can be measured with a micrometer or an optical microscope.

Ceramic main body 11 includes a first end surface 15a and a second end surface 15b opposed to each other in length direction L, a first principal surface 16a and a second principal surface 16b opposed to each other in lamination direction T, and a first side surface 17a and a second side surface 17b opposed to each other in width direction W.

First external electrode 14a is provided on first end surface 15a, and second external electrode 14b is provided on second end surface 15b.

Preferably, ceramic main body 11 includes rounded corners and rounded ridges. The corners are portions in which three surfaces of ceramic main body 11 intersect with one another, and the ridges are portions in which two surfaces of ceramic main body 11 intersect with each other.

As illustrated in FIGS. 2 and 3, ceramic main body 11 includes a plurality of laminated dielectric layers 12 and a plurality of internal electrodes 13a, 13b. Internal electrodes 13a, 13b include a first internal electrode 13a and a second internal electrode 13b. More particularly, ceramic main body 11 has a structure in which the pluralities of first internal electrodes 13a and second internal electrodes 13b are alternately laminated with a dielectric layer 12 interposed therebetween in lamination direction T.

Dielectric layer 12 includes an outer-layer dielectric layer 121 located on both outer sides in lamination direction T of ceramic main body 11 and an inner-layer dielectric layer 122 located between first internal electrode 13a and second internal electrode 13b. For example, outer-layer dielectric layer 121 preferably has a thickness of about 20 μm, and inner-layer dielectric layer 122 has a thickness of about 0.8 μm. As illustrated in FIG. 3, in dielectric layer 12, a region sandwiched between two outer-layer dielectric layers 121 located on both outer sides in lamination direction T of ceramic main body 11 and located outside the ends in width direction of internal electrodes 13a, 13b is referred to as a side gap region 123. Preferably, the thickness of outer-layer dielectric layer 121 is less than or equal to about 300 μm, for example, in order to cause Si to reach internal electrodes 13a, 13b.

For example, dielectric layer 12 is preferably made of a dielectric material mainly including $BaTiO_3$, $CaTiO_3$, $SrTiO_3$, $CaZrO_3$, or the like. Sub-components, such as a Mn compound, an Fe compound, a Cr compound, a Co compound, and a Ni compound, which have smaller contents than the main component, may be added to the main component.

In the present preferred embodiment, dielectric layer 12 preferably includes at least one element of Si and Mg, for example. At least one element of Si and Mg is included in dielectric layer 12, which allows dielectric layer 12 to be densified to decrease a void, and generation of a crack can be prevented. In this case, at least one element of Si and Mg included in dielectric layer 12 is referred to as an element M.

In an amount of element M included in a rectangular or substantially rectangular area of about 10 μm×about 10 μm of dielectric layer 12 in planar view in a section defined by width direction W and lamination direction T, the section being obtained by cutting ceramic main body 11 at a central position in length direction L, the outside in width direction W of dielectric layer is higher than the central portion in width direction W of dielectric layer 12. The central portion in width direction W of dielectric layer 12 is a position of a portion sandwiched between first internal electrode 13a and second internal electrode 13b, and the outside in width direction W of dielectric layer 12 is a position in side gap region 123.

In a section defined by width direction W and lamination direction T of ceramic main body 11, a segregation amount of element M existing in the rectangular or substantially rectangular region of about 10 μm×about 10 μm located on the outside in width direction W of dielectric layer 12 is larger than a segregation amount of element M existing in the rectangular or substantially rectangular region of about 10 μm×about 10 μm located on the outside in lamination direction T of dielectric layer 12. "The rectangular or substantially rectangular region of about 10 μm×about 10 μm located on the outside in width direction W of dielectric layer 12" is the rectangular or substantially rectangular region of about 10 μm×about 10 μm in the side gap region 123, and "the rectangular or substantially rectangular region of about 10 μm×about 10 μm located on the outside in lamination direction T of dielectric layer 12" is the rectangular or substantially rectangular region of about 10 μm×about 10 μm in outer-layer dielectric layer 121.

For example, the segregation amount of element M can be obtained using a wavelength dispersion X-ray analyzer (hereinafter, referred to as WDX). For example, ceramic main body 11 is polished up to the central portion in length direction L to expose the section defined by width direction W and lamination direction T, and the segregation amount can be obtained by specifying the region where M is segregated in the rectangular or substantially rectangular region of about 10 μm×about 10 μm using the WDX.

An average particle size of the dielectric particles located at the end in width direction W of dielectric layer 12, namely, outer-layer dielectric layer 121 located on the outside in lamination direction T is preferably, for example, greater than or equal to about 50 nm and less than or equal to about 1000 nm. The average particle size of the dielectric particles existing at the central portion in width direction W of dielectric layer 12 located at the central portion in lamination direction T is preferably, for example, greater than or equal to about 50 nm and less than or equal to about 500 nm.

First internal electrode 13a extends to first end surface 15a of ceramic main body 11. Second internal electrode 13b extends to second end surface 15b of ceramic main body 11.

Ceramic main body 11 may include an internal electrode that is not exposed to the surface in addition to first internal electrode 13a and second internal electrode 13b.

First internal electrode 13a includes a counter electrode opposed to second internal electrode 13b and an extraction electrode extending from the counter electrode to first end surface 15a of ceramic main body 11. Second internal electrode 13b includes a counter electrode opposed to first internal electrode 13a and an extraction electrode extending the counter electrode to second end surface 15b of ceramic main body 11.

The counter electrode of first internal electrode 13a and the counter electrode of second internal electrode 13b are opposed to each other with dielectric layer 12 interposed therebetween, thus generating a capacitance to define and function as a capacitor.

For example, first internal electrode 13a and second internal electrode 13b preferably include metal such as Cu, Ni, Ag, Pd, Ti, Cr, and Au or an alloy mainly including the metal. First internal electrode 13a and second internal electrode 13b may include dielectric particles having the same composition system as the ceramic included in dielectric layer 12 as a common material.

For example, first internal electrode 13a and second internal electrode 13b preferably have the thickness of about 0.8 μm. For example, the number of laminated internal electrodes including first internal electrode 13a and second internal electrode 13b is preferably 500.

The cavity is generated in first internal electrode 13a and second internal electrode 13b in the manufacturing process. In multilayer ceramic capacitor 10 of the present preferred embodiment, element M is segregated in at least some cavities of first internal electrode 13a and second internal electrode 13b. With this structure, continuity of internal electrodes 13a, 13b is improved.

In the section defined by width direction W and lamination direction T, the section being obtained by cutting ceramic main body 11 at the position of the central portion in length direction L, the continuity of internal electrodes 13a, 13b within a range of about 10 μm from the end in width direction W of internal electrodes 13a, 13b is preferably greater than or equal to about 95%, for example.

Figure 4:
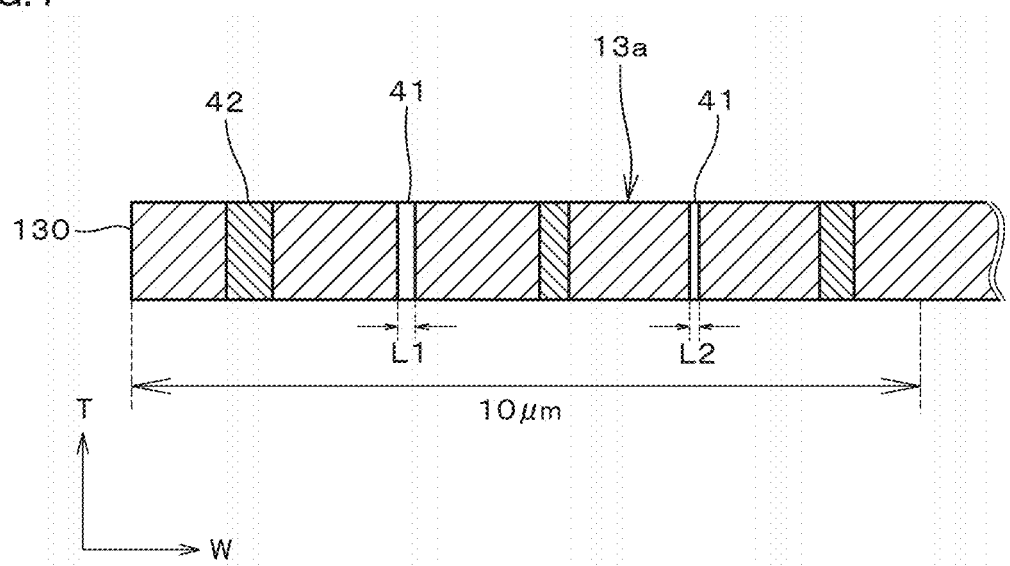
FIG. 4 is a view schematically illustrating a section of an end in a width direction of a first internal electrode located in a central portion in a lamination direction of a ceramic main body when a section defined by a width direction and a lamination direction of the ceramic main body is exposed in a central portion in a length direction of the ceramic main body.

FIG. 4 is a view schematically illustrating a section of an end in width direction W of first internal electrode 13a located in the central portion in lamination direction T of ceramic main body 11 when the section defined by width direction W and lamination direction T of the ceramic main body 11 is exposed in the central portion in length direction L of the ceramic main body 11. The continuity of first internal electrode 13a will be described below, but the same is true for the continuity of second internal electrode 13b.

As illustrated in FIG. 4, a cavity 41 may exist partially in first internal electrode 13a. In first internal electrode 13a, a segregation portion 42 also exists in which element M is segregated in the cavity formed during manufacturing. First internal electrode 13a is discontinuous at the position where cavity 41 exists, but is continuous in segregation portion 42. At this point, K defined by the following equation (1) is defined as the continuity of first internal electrode 13a based on the total dimension (L1+L2) of the plurality of cavities 41 within a range of about 10 μm from an end 130 of first internal electrode 13a in width direction W. However, a unit of the dimensions L1, L2 in the width direction of cavity 41 is μm.

$$K=\{1-(L1+L2)/10\}\times 100 \quad (1)$$

In the section defined by width direction W and lamination direction T, preferably the continuity of internal electrodes 13a, 13b within the range of about 10 μm from the ends of internal electrodes 13a, 13b in width direction W is greater than or equal to about 98%, for example.

First external electrode 14a is provided on the entire or substantially the entire first end surface 15a of ceramic main body 11, and extends to first principal surface 16a, second principal surface 16b, first side surface 17a, and second side surface 17b from first end surface 15a. First external electrode 14a is electrically connected to first internal electrode 13a.

Second external electrode 14b is provided on the entire or substantially the entire second end surface 15b of ceramic main body 11, and extends to first principal surface 16a, second principal surface 16b, first side surface 17a, and second side surface 17b from second end surface 15b. Second external electrode 14b is electrically connected to second internal electrode 13b.

For example, first external electrode 14a and second external electrode 14b include an underlayer electrode layer and a plating layer disposed on the underlayer electrode layer.

The underlayer electrode layer includes at least one of layers such as, for example, a baked electrode layer, a resin electrode layer, and a thin film electrode layer (to be described below).

The baked electrode layer preferably includes glass and metal, and may be a single layer or a plurality of layers. For example, the baked electrode layer preferably includes metal such as Cu, Ni, Ag, Pd, and Au or an alloy of Ag and Pd.

The baked electrode layer is formed by applying and baking a conductive paste including glass and metal to a laminated body. The baking may be performed at the same time as the baking of the laminates body, or performed after the baking of the ceramic main body.

For example, the resin electrode layer can be formed as a layer including conductive particles and a thermosetting resin. When the resin electrode layer is formed, the resin electrode layer may be directly formed on the ceramic main body without forming the baked electrode layer. The resin electrode layer may be a single layer or a multilayer.

For example, the thin film electrode layer preferably has a thickness less than or equal to about 1 μm on which metal particles are deposited, and the thin film electrode layer can be formed by a known thin film forming method such as a sputtering method or an evaporation method, for example.

For example, the plating layer disposed on the underlayer electrode layer preferably includes at least one of metal such as Cu, Ni, Ag, Pd, and Au and an alloy of Ag and Pd. The plating layer may be a single layer or a multilayer. However, preferably the plating layer has a two-layer structure of a Ni plating layer and a Sn plating layer, for example. The Ni plating layer prevents the underlayer electrode layer from being eroded by solder in mounting multilayer ceramic capacitor 10. The Sn plating layer improves wettability of solder in mounting multilayer ceramic capacitor 10.

First external electrode 14a and second external electrode 14b may not include the underlayer electrode layer, but may include the plating layer directly disposed on ceramic main body 11. In this case, the plating layer is directly connected to first internal electrode 13a or second internal electrode 13b.

Method for Manufacturing Multilayer Ceramic Capacitor

A non-limiting example of a method for manufacturing multilayer ceramic capacitor 10 will be described below.

First, a ceramic green sheet, an internal-electrode conductive paste, and an external-electrode conductive paste are prepared. A known ceramic green sheet and a known internal-electrode conductive paste each of which includes an organic binder and an organic solvent can be used.

Subsequently, an internal-electrode pattern is formed by printing the internal-electrode conductive paste on the ceramic green sheet. The printing of the internal-electrode conductive paste can be performed by a printing method such as screen printing or gravure printing, for example.

Subsequently, a predetermined number of ceramic green sheets on each of which the internal-electrode pattern is not formed are laminated, the ceramic green sheets on each of which the internal-electrode pattern is formed are sequentially laminated on the predetermined number of ceramic green sheets, and a predetermined number of ceramic green sheets on each of which the internal-electrode pattern is not formed are laminated on the ceramic green sheets on each of which the internal-electrode pattern is formed, thus preparing a mother laminated body.

Subsequently, the mother laminated body is pressed in the lamination direction by a method such as, for example, a rigid press and an isostatic press, and cut into a predetermined size by a cutting method such as, for example, press-cutting, dicing, or laser to obtain a laminated chip. Thereafter, the corner and the ridge of the laminated chip may be rounded by, for example, barrel polishing or the like.

Subsequently, the external-electrode conductive paste is applied to both of the end surfaces, a portion of both the principal surfaces, and a portion of both the side surfaces of the laminated chip. For example, the external-electrode conductive paste may include, for example, Cu powders, glass frit, and an organic solvent.

Subsequently, the entire laminated chip is immersed in, for example, a water-soluble colloidal silica, a dispersion of a water-soluble magnesium compound, or a solution prepared by adjusting a concentration of two kinds of mixed solutions using pure water, and a vacuum state is obtained, whereby the solution including element M permeate the laminated chip.

Thereafter, the laminated chip is dried and baked. For example, a baking temperature is preferably greater than or equal to about 900° C. and less than or equal to about 1300° C. although the baking temperature depends on the ceramic material and the conductive paste material used. Consequently, the ceramic main body and the metal layer of the external electrode are formed.

Finally, the plating layer is formed on the surface of the metal layer.

The multilayer ceramic capacitor can be manufactured through the above processes.

In the above manufacturing process, the laminated chip to which the external-electrode conductive paste is applied is immersed in the solution including element M. Alternatively, the external-electrode conductive paste may be applied and baked after the laminated chip is immersed in the solution including element M before the external-electrode conductive paste is applied. In this case, because the solution including element M permeates the laminated chip from both of the end surfaces of the laminated chip, the dielectric layer is further densified. More preferably, preliminary baking is performed so as to form the cavity in the dielectric layer before the baking. For example, the baking temperature of the preliminary baking is preferably greater than or equal to about 700° C. and less than or equal to about 1200° C.

In the above manufacturing process, a CV (Coefficient of Variation) value of the dielectric particles, the particle size, the segregation amount of element M, and cavity amount in the dielectric layer were examined with respect to the case where the laminated chip is immersed in the solution including element M and the case where the laminated chip is not immersed in the solution containing element M. FIGS. 5 to 8 illustrate the results. In FIGS. 5 to 8, an "outside end" of a horizontal axis is an end in width direction W of ceramic main body 11, and an "electrode end" is an end of each of internal electrodes 13a, 13b in width direction W of ceramic main body 11. That is, a region from an outer end to an electrode end illustrated in a horizontal axis in FIGS. 5 to 8 corresponds to side gap region 123. In this example, Si was used as element M.

Figure 5:
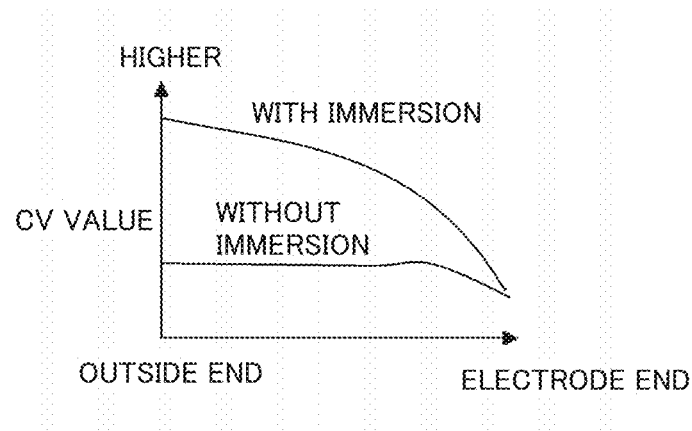
FIG. 5 is a graph illustrating a relationship between a position in the width direction of the ceramic main body and a CV (Coefficient of Variation) of dielectric particles.

FIG. 5 is a graph illustrating a relationship between a position in width direction W of ceramic main body 11 and the CV value of the dielectric particles. As illustrated in FIG. 5, in the case where the laminated chip was immersed in the solution including element M, the CV value of the dielectric particles was higher than that of the case where the laminated chip was not immersed in the solution including element M.

Figure 6:
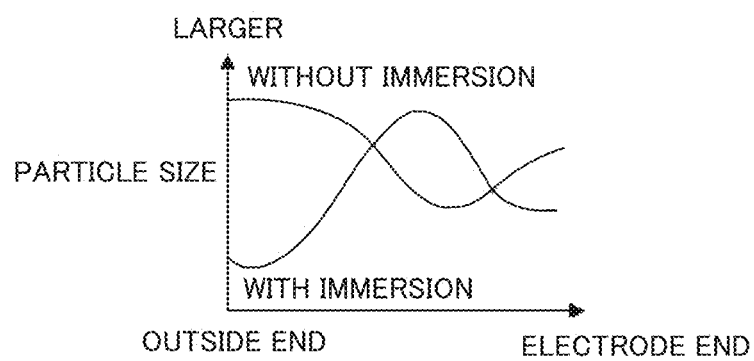
FIG. 6 is a graph illustrating a relationship between the position in the width direction of the ceramic main body and a particle size of the dielectric particles.

FIG. 6 is a graph illustrating a relationship between the position in width direction W of ceramic main body 11 and a particle size of the dielectric particles. As can be seen from FIG. 6, in the region near the end in width direction W of ceramic main body 11, the particle size of the dielectric particle is larger in the case where the laminated chip is not immersed in the solution including element M.

Figure 7:
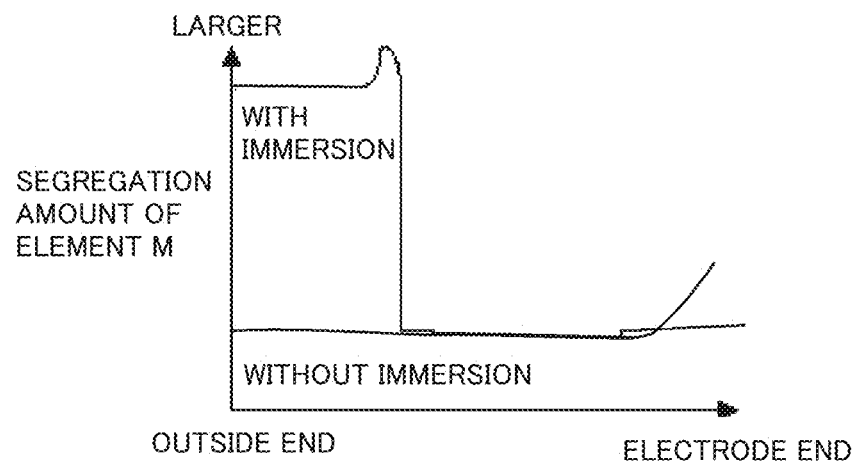
FIG. 7 is a graph illustrating a relationship between the position in the width direction of the ceramic main body and a segregation amount of an element.

FIG. 7 is a graph illustrating a relationship between the position in width direction W of ceramic main body 11 and the segregation amount of element M in dielectric layer 12. As can be seen from FIG. 7, in the region near the end in width direction W of dielectric layer 12, the segregation amount of element M is larger in the case where the laminated chip is immersed in the solution including element M.

Figure 8:
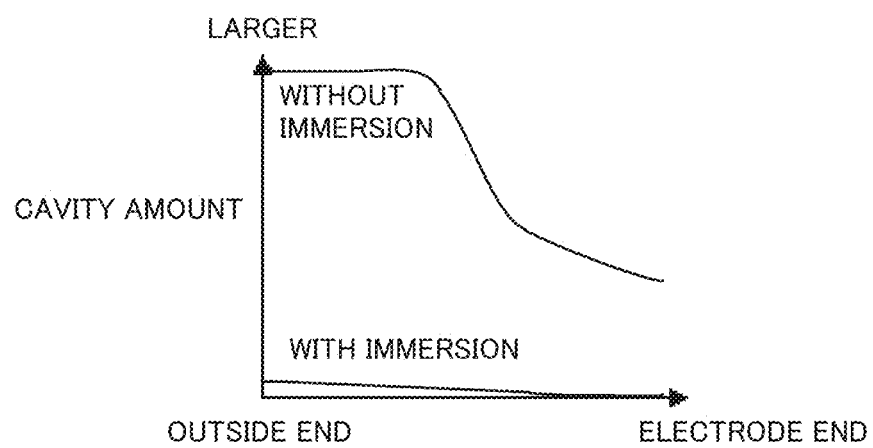
FIG. 8 is a graph illustrating a relationship between the position in the width direction of the ceramic main body and a cavity amount in a dielectric layer.

FIG. 8 is a graph illustrating a relationship between the position in width direction W of ceramic main body 11 and the cavity amount in a dielectric layer 12. As illustrated in FIG. 8, in the case where the laminated chip is immersed in the solution including element M, the cavity amount in the dielectric layer is smaller than that of the case where the laminated chip is not immersed.

Figure 9:
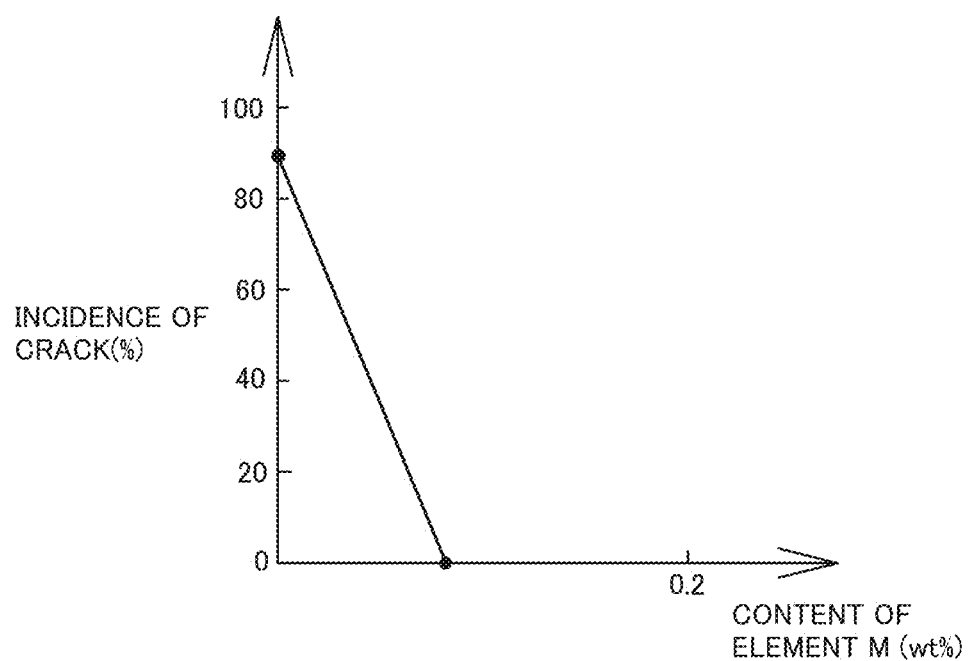
FIG. 9 is a graph of experimental data illustrating a relationship between a content of an element M in the ceramic main body and an incidence of a crack in the ceramic main body.

FIG. 9 is a graph of experimental data illustrating a relationship between a content of element M in ceramic main body 11 and an incidence of a crack in ceramic main body 11. Si was used as element M.

As illustrated in FIG. 9, the incidence of a crack was about 90% for the structure in which element M is not included in ceramic main body 11, whereas the incidence of a crack was 0% for the structure in which ceramic main body 11 included less than about 0.1 wt % of element M.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a ceramic main body including a plurality of laminated dielectric layers and a plurality of internal electrodes, the ceramic main body including a first principal surface and a second principal surface opposed to each other in a lamination direction, a first side surface and a second side surface opposed to each other in a width direction orthogonal or substantially orthogonal to the lamination direction, and a first end surface and a second end surface opposed to each other in a length direction orthogonal or substantially orthogonal to the lamination direction and the width direction; and
external electrodes electrically connected to the plurality of internal electrodes and provided on each of the first end surface and the second end surface of the ceramic main body; wherein
the plurality of dielectric layers includes at least one element of Si and Mg;
in a section defined by the width direction and the lamination direction, the section being obtained by cutting the ceramic main body at a position of a central portion in the length direction, an outside in the width direction is higher than a central portion in the width direction in an amount of the at least one element existing in a rectangular or substantially rectangular region of about 10 μm×about 10 μm of the plurality of dielectric layers in planar view;
within a range of about 10 μm from an end in the width direction of the plurality of internal electrodes, at least one of the plurality of internal electrodes includes at least one cavity at which the at least one of the plurality of internal electrodes is discontinuous; and
continuity of the plurality of internal electrodes within the range of about 10 μm from the end in the width direction of the plurality of internal electrodes is greater than or equal to about 95%.

2. The multilayer ceramic capacitor according to claim 1, wherein in the section defined by the width direction and the lamination direction of the ceramic main body, a segregation amount of the at least one element existing in a rectangular or substantially rectangular region of about 10 μm×about 10 μm located on an outside in the width direction of the dielectric layers is larger than a segregation amount of the at least one element existing in a rectangular or substantially rectangular region of about 10 μm×about 10 μm located on an outside in the lamination direction of the dielectric layers.

3. The multilayer ceramic capacitor according to claim 1, wherein the continuity of the internal electrodes within the range of about 10 μm from the end in the width direction of the internal electrodes is greater than or equal to about 98%.

4. The multilayer ceramic capacitor according to claim 1, wherein
an average particle size of a dielectric particle existing at an end in the width direction of the dielectric layers located on an outside in the lamination direction is greater than or equal to about 50 nm and less than or equal to about 1000 nm; and
an average particle size of a dielectric particle existing in the central portion in the width direction of the dielectric layers located in a central portion in the lamination direction is greater than or equal to about 50 nm and less than or equal to about 500 nm.

5. The multilayer ceramic capacitor according to claim 1, wherein the at least one element is segregated in at least a portion of a cavity of the internal electrodes.

6. The multilayer ceramic capacitor according to claim 1, wherein dimensions of the ceramic main body in the length direction, the width direction, and the lamination direction are in a range from about 0.2 mm to about 3.2 mm, a range from about 0.1 mm to about 2.5 mm, and a range from about 0.1 mm to about 2.5 mm, respectively.

7. The multilayer ceramic capacitor according to claim 1, wherein the ceramic main body includes rounded corners and rounded ridges.

8. The multilayer ceramic capacitor according to claim 1, wherein the plurality of dielectric layers include outer-layer dielectric layers on both sides in the lamination direction of the ceramic main body, and inner-layer dielectric layers between the outer-layer dielectric layers.

9. The multilayer ceramic capacitor according to claim 8, wherein each of the outer-layer dielectric layers has a thickness of about 20 μm, and each of the inner-layer dielectric layers has a thickness of about 0.8 μm.

10. The multilayer ceramic capacitor according to claim 1, wherein the plurality of dielectric layers include a dielectric material mainly including $BaTiO_3$, $CaTiO_3$, $SrTiO_3$, or $CaZrO_3$ as a main component.

11. The multilayer ceramic capacitor according to claim 10, wherein the plurality of dielectric layers further include at least one of a Mn compound, an Fe compound, a Cr compound, a Co compound, and a Ni compound as a sub-component having smaller contents than the main component.

12. The multilayer ceramic capacitor according to claim 1, wherein the plurality of internal electrodes include Cu, Ni, Ag, Pd, Ti, Cr, or Au, or an alloy mainly including Cu, Ni, Ag, Pd, Ti, Cr, or Au.

* * * * *